358-74. SR 12-2-75 XR 3,924,067

United States Patent [19]

Arneson

[11] 3,924,067

[45] Dec. 2, 1975

[54] AUTOMATIC BEAM CURRENT LIMITER WITH VIDEO HOLD-OFF

[75] Inventor: Blayne E. Arneson, Evergreen Park, Ill.

[73] Assignee: Admiral Corporation, Chicago, Ill.

[22] Filed: Aug. 16, 1974

[21] Appl. No.: 497,879

[52] U.S. Cl........ 178/7.5 DC; 358/74; 178/DIG. 29

[51] Int. Cl.[2]....................... H04N 3/16; H04N 9/16

[58] Field of Search..178/DIG. 29, 7.5 DC, DIG. 11; 358/74

[56] References Cited

UNITED STATES PATENTS

| | | | |
|---|---|---|---|
| 3,465,095 | 9/1969 | Hansen et al. | 178/7.5 |
| 3,541,240 | 11/1970 | Curtis | 358/74 |
| 3,767,854 | 10/1973 | Stark et al. | 358/74 |

*Primary Examiner*—George H. Libman
*Assistant Examiner*—R. John Godfrey

[57] ABSTRACT

An improved circuit for a television receiver which provides the combined function of limiting the brightness in the cathode ray tube and further including a turn-on delay which prevents the cathode ray tube from being injured due to high voltages being applied to the cathodes before they have had time to become sufficiently heated.

6 Claims, 9 Drawing Figures

(PRIOR ART CIRCUIT)

WITH HOLD OFF CIRCUIT

RC TOO SMALL

PROPER RC

AUTOMATIC BEAM CURRENT LIMITER WITH VIDEO HOLD-OFF

BACKGROUND OF THE INVENTION

1. Field of the Invention

This invention relates in general to television receivers and in particular to a novel brightness limiter and turn-on delay circuit.

2. Description of the Prior Art

In television receivers of the prior art, it is possible that injury can result to the cathode ray tube due to the brightness being set to too high a level. Furthermore setting the brightness at too high a level in addition to decreasing the life of the tube can lead to radiation hazards due to the high beam current. Also, in television receivers of the prior art, high voltage has been applied to the cathodes before the cathodes have had sufficient time to come to operating temperature which injures the cathodes and results in shortening of the life of the tube.

SUMMARY OF THE INVENTION

The present invention provides a novel brightness limiting circuit for a television receiver and further includes a circuit which assures that injurious voltages will not be applied to the cathodes of the electron guns until the cathodes have reached a suitable operating temperature. The video amplifier which drives the electron guns is controlled with a brightness limiter transistor. The brightness control transistor has its base electrode coupled to a voltage divider so as to set its operating point, and a capacitor is connected across at least part of the voltage divider to ground. When power is initially applied to the circuit, the capacitor maintains the voltage on the base of the brightness limiter transistor at a level which keeps it turned off due to the fact that at initiation of power, the condenser is charging. After a predetermined time, the condenser charges to a suitable voltage to allow the brightness limiter transistor to conduct which turns on the video amplifier and applies drive to the guns of the cathode ray tube. Prior to the time the condenser is charged, the cathodes will have reached operating temperature, thus avoiding the injurious conditions of having a high voltage applied to cold cathodes.

Additionally, a feedback signal is applied from the output of the voltage tripler to the base of the brightness limiter transistor. The output of the voltage tripler is proportional to the beam current; and if the beam current increases, the circuit of the invention adjusts the bias on the brightness limiter so that the video amplifier causes the blue, red, and green drivers to decrease the beam current.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figures 1, 2, 3, 4:
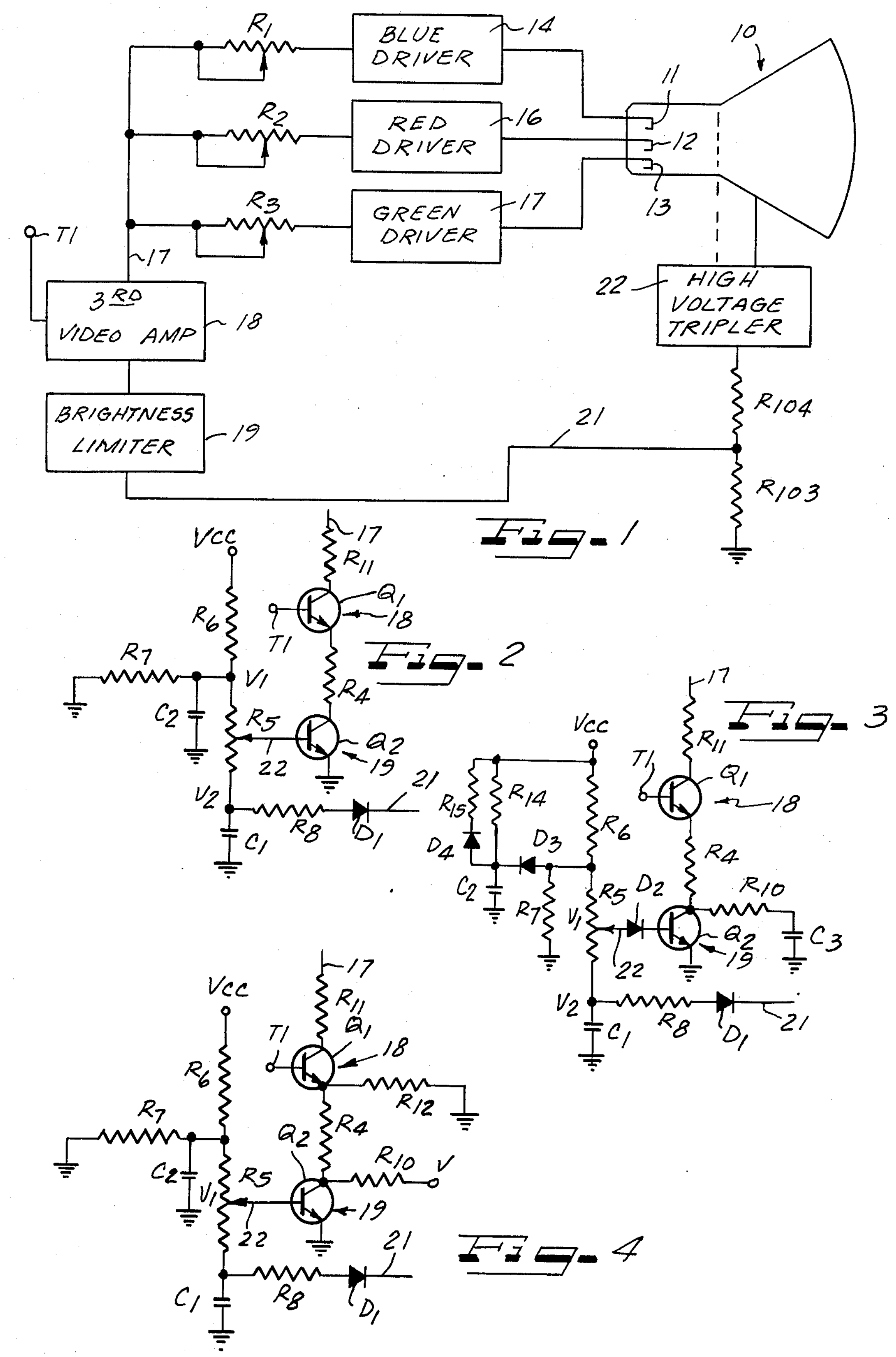
FIG. 1 illustrates in block form a portion of a television receiver for illustrating the invention.
FIG. 2 illustrates the improved brightness limiter and turnon delay circuit of the invention.
FIG. 3 illustrates a modified circuit of the invention.
FIG. 4 illustrates a further modification of the invention.

FIG. 1 is a partial block diagram of a color television receiver illustrating the cathode ray tube 10 which includes blue, red and green guns as illustrated by the blue cathode 11, the red cathode 12, and the green cathode 13. A blue driver 14 is connected to the cathode 11; a red driver 16 is connected to the cathode 12; and a green driver 17 is connected to the cathode 13. A third video amplifier 18 supplies an output on lead 17 to the drivers 14, 16 and 17 through variable resistors $R_1$, $R_2$, and $R_3$. A brightness limiter 19 provides control for the third amplifier 18 and receives an input from lead 21 from the high voltage tripler 22 which has its ground return connected through resistors $R_{104}$ and $R_{103}$. The lead 21 is tapped between resistors $R_{103}$ and $R_{104}$.

FIG. 2 illustrates the video amplifier 18 and the brightness limiter 19 in greater detail. The video amplifier 18 comprises a transistor $Q_1$ which has its collector connected to lead 17 to provide control of the blue, red, and green drivers 14, 16, and 17. A resistor $R_4$ is connected between the emitter of transistor $Q_1$ and the collector of transistor $Q_2$. Transistor $Q_2$ has its emitter connected to ground. The base of transistor $Q_1$ receives the input video signal on terminal $T_1$. The base of transistor $Q_2$ is connected to a wiper contact 22 which engages a resistor $R_5$. Resistor $R_5$ has one end connected to a capacitor $C_1$ which has its other side connected to ground. The other end of resistor $R_5$ is connected to the junction point between resistor $R_6$ and $R_7$ which form a voltage divider. The other side of resistor $R_7$ is connected to ground and the other side of resistor $R_6$ is connected to a suitable bias voltage Vcc such as plus 24 volts. A capacitor $C_2$ is connected between the junction point of the resistors $R_6$ and $R_7$ and ground. Resistor $R_8$ and diode $D_1$ are connected from a voltage point $V_2$ to the lead 21 as illustrated in FIG. 1.

In a particular circuit constructed according to this invention, the following circuit elements are used:

$R_5 = 20k$ ohms
$R_6 = 100k$ ohms
$R_7 = 68k$ ohms

During normal operation conditions, the voltage $V_1$ at the junction between resistors $R_6$ and $R_7$ is normally positive at approximately three volts. The voltage $V_2$ at the junction point between resistor $R_5$ and capacitor $C_1$ is negative at approximately 0.75 volts with 1.8 ma. beam current. Wiper contact 22 is set to limit the maximum average beam current to 1.8 ma. with maximum control and brightness.

In operation, the output across resistor $R_{103}$ will comprise negative peaks proportional to the beam current. If the beam current increases, lead 21 will supply this voltage through the diode $D_1$ and resistor $R_8$ to point $V_2$, causing the voltage $V_1$ to decrease, thus reducing the positive bias on transistor $Q_2$ which will gradually cut off transistor $Q_2$ as voltage $V_1$ approaches zero. When transistor $Q_2$ tends toward cut-off, transistor $Q_1$ reduces the current to the blue, red, and green drivers 14, 16, and 17, respectively, thus reducing the beam current. Normally, transistor $Q_2$ is biased to saturation and allows maximum current in transistor $Q_1$. However, as the beam current increases, transistor $Q_2$ begins to turn off because of the increasing potential at the bottom of resistor $R_5$ due to the signal from the voltage tripler on lead 21 which is proportional to beam current, thus, adjusting and reducing conduction through the transistor $Q_2$. This in turn changes the bias of transistor $Q_1$ which increases the voltage on the emitter of transistor $Q_1$ and decreases the drive to the drivers 14, 16, and 17.

The capacitor $C_2$ holds the video initially off after the receiver is turned on. When the TV power is initially applied, voltage $V_1$ is initially near zero due to the high charging current in the capacitor $C_2$. This maintains the voltage $V_1$ near zero which keeps transistor $Q_2$ and transistor $Q_1$ turned off; and consequently, the cathode ray tube gun is off. As capacitor $C_2$ charges, voltage $V_1$ rises and transistor $Q_2$ starts to conduct, turning on transistor $Q_1$. Voltage on the cathodes 11, 12, and 13 begins to drop and beam current increases and the voltage $V_2$ begins to go negative until maximum beam current reaches the limit established by the setting of the variable contact 22 on resistor $R_5$.

In a practical circuit, transistor $Q_1$ begins to turn on after 13 seconds and this depends primarily on the values of the resistors $R_6$ and $R_7$ and the capacitor $C_2$.

FIG. 3 illustrates another embodiment of the invention. In the circuit of FIG. 3, a resistor $R_{10}$ and capacitor $C_3$ are connected in series between the collector of transistor $Q_2$ and ground and a diode $D_2$ is connected between contact 22 and the base of transistor $Q_2$. Also shown in FIG. 3 is a modification of the connection of $C_2$ which improves the action of the brightness limiter. $C_2$ is connected to the junction of $R_6$ and $R_7$ via a diode $D_3$. At turn-on, $C_2$ is discharged so that $V_1$ is held low as $C_2$ charges. $R_{14}$ is much larger than $R_6$, for example, one megohm, therefore, the charging path for $C_2$ is primarily $R_6$, $D_3$, providing the turn-on delay. As the voltage on $C_2$ approaches the value which will be established by the dividers $R_5$, $R_6$, and $R_7$, the voltage across $D_3$ approaches zero. However, $C_2$ will continue to charge through $R_{14}$ causing a reverse bias on $D_3$ and effectively disconnecting $C_2$ from the brightness limiter. Thus, $C_2$ provides only a turn-on delay as desired. At turn-off, Vcc drops to zero and $C_2$ discharges through $R_{15}$ and $D_4$.

FIG. 4 illustrates another form of the invention, wherein the capacitor $C_3$ and diode $D_2$ have been removed. A resistor $R_{12}$ has been added between the emitter of transistor $Q_1$ and ground.

Figure 5:
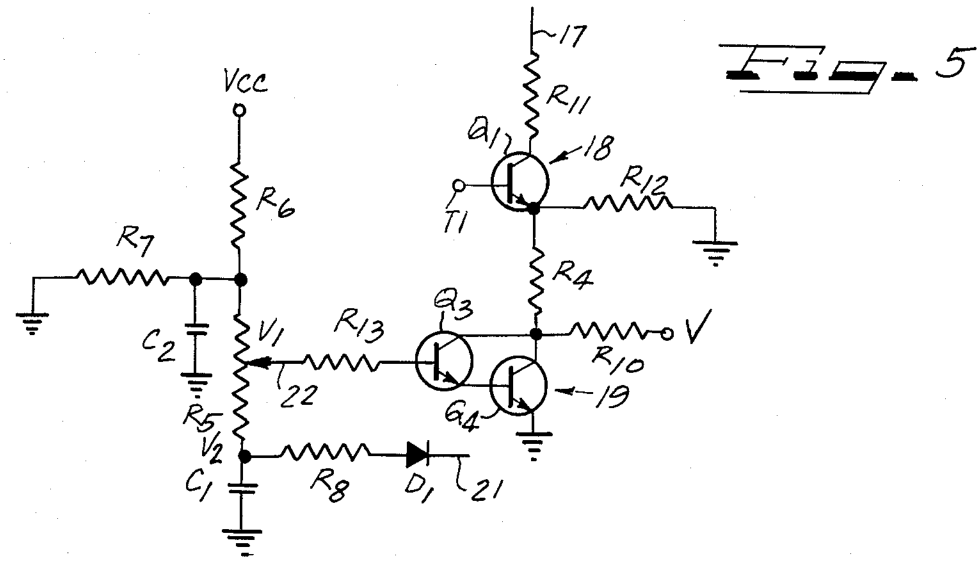
FIG. 5 illustrates another modification of the invention.

The circuit of FIG. 5 illustrates a modification wherein transistor $Q_2$ is replaced with two transistors $Q_3$ and $Q_4$ connected in Darlington fashion for improved brightness limiter response.

Figure 6:
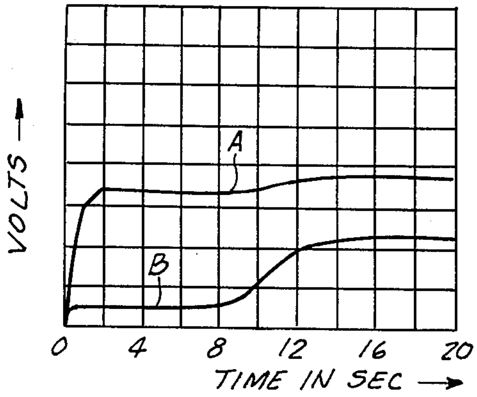
FIGS. 6–9 illustrate reproductions of cathode ray traces for explaining and illustrating the advantages of the present invention.

FIG. 6 illustrates cathode ray traces showing the positive and negative grid voltage limits A and B of the video signal after initial turn-on of the receiver. It is to be noted that the grid of the cathode ray tube would be biased in the unmodified set prior to the invention with voltages high enough to cause injury to the cathode ray tube. This voltage is the vertical distance between traces A and B which does not reach the desired operating level until 12 seconds after the set has been turned on. This could cause injury to the CRT.

Figure 7:
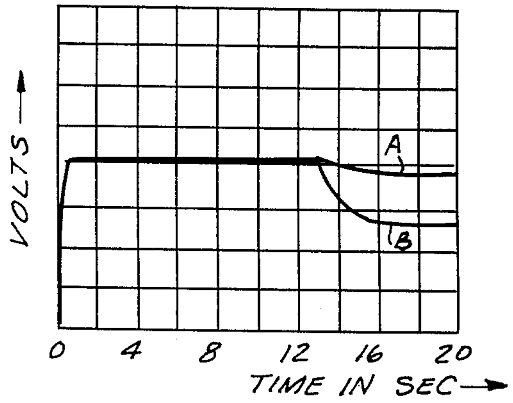

FIG. 7 illustrates the traces obtained for the video envelope in a receiver utilizing the invention illustrated in FIG. 2. It is to be particularly noted that from time zero until 13 seconds after turn-on that the positive and negative traces A and B of the video envelope coincide; and thus, no injurious voltage will be applied to the cathode ray tube. After 13 seconds, the cathode of the cathode ray tube will be heated and as condenser C2 charges up, the positive and negative envelope limits of the video will separate as shown at the right of FIG. 7. This illustrates that the initial turn-on protection is obtained.

Figure 8:
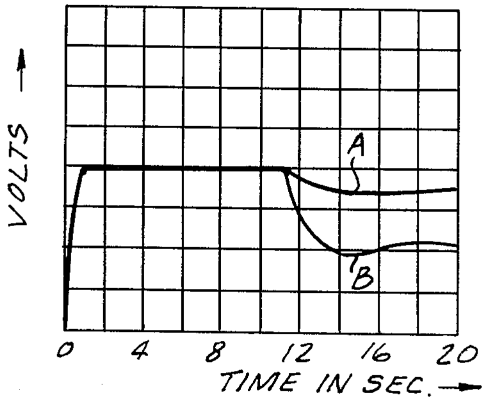

FIG. 8 is a trace illustrating the turn-on conditions wherein the capacitor $C_2$ has a smaller value than that for which the trace was obtained in FIG. 7, and it is to be noted that the negative trace B dips below the desired value at 14 seconds before rising to the proper level. It is undesirable that the spread between the negative and positive traces A and B reach the limits illustrated in FIG. 8 immediately after turn-on. In this case, capacitor $C_2$ has a value of 100 mfd.

Figure 9:
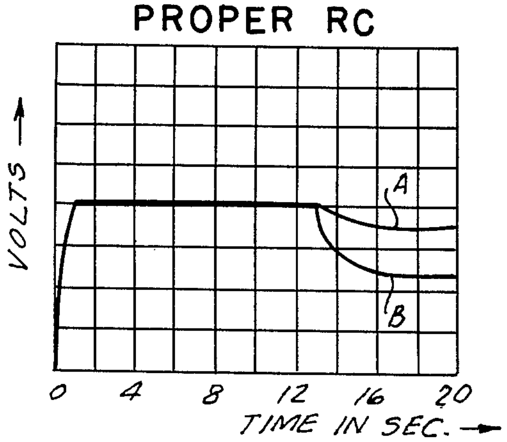

FIG. 9 illustrates the traces obtained with a capacitor $C_2$ having a value of 1,000 mfd with resistor $R_6$ having a value of 100,000 ohms and resistor $R_7$ having a value of 68,000 ohms. These component values produce the desired turn-on characteristics.

It is seen that this invention provides a novel automatic beam current limiter and video hold-off circuit for a television receiver. Although it has been described with respect to preferred embodiments, it is not to be so limited as changes and modifications may be made which are within the full intended scope as defined by the appended claims.

I claim as my invention:

1. A circuit for automatic beam current limiting and video hold off for a television receiver including a cathode ray tube whose cathodes are unheated prior to turn on comprising, a power source, a video amplifier connected to supply drive to the cathode ray tube of said receiver, a brightness limiter means connected to said video amplifier to control its output, means for sensing the beam current in said cathode ray tube connected to said brightness limiter means to control its output, and time delay means connected to said brightness limiter means and said power source and delaying the application of power to said brightness limiter means at turn on.

2. A circuit according to claim 1 wherein said brightness limiter means comprises a first transistor connected to control said video amplifier and said time delay means comprises a first resistor and a first capacitor connected across said power source and the control electrode of said first transistor coupled to said first resistor and said capacitor.

3. A circuit according to claim 2 including a second resistor connected between said means for sensing the beam current and said first resistor and the control electrode of said first transistor coupled to said second resistor.

4. A circuit according to claim 2 wherein said video amplifier comprises a second transistor with its collector-emitter circuit connected in series with the collector-emitter circuit of said first transistor.

5. A circuit according to claim 4 including a fourth resistor connected between said power source and said first capacitor and having a resistance substantially higher than said first resistor, and a diode coupled between said first capacitor and said control electrode of said first transistor for effectively disconnecting said first capacitor from said first transistor when said first capacitor has charged to a predetermined voltage.

6. A circuit according to claim 2 wherein said brightness limiter means includes a third transistor connected in Darlington fashion with said first transistor.

* * * * *